United States Patent Office 3,341,517
Patented Sept. 12, 1967

3,341,517
PRODUCTION AND USE OF DIAZASPIRO-
ALKANES
Karl-Heinz Buechel, Beuel, Alexius Kiskéri Bocz, Bonn,
and Friedrich W.A.G.K. Korte, Hangelar, Germany,
assignors to Shell Oil Company, New York, N.Y., a
corporation of Delaware
No Drawing. Filed Feb. 17, 1964, Ser. No. 345,108
Claims priority, application Germany, June 12, 1963,
S 85,661
6 Claims. (Cl. 260—239)

ABSTRACT OF THE DISCLOSURE 2,3' - dihydrocarbyl - 2,3' - diaza - 2' - oxo - dicycloalkylidines, each of said azacycloalkylidine rings containing from 5 to 7 members, are contacted with aqueous acid to produce N,N'-dihydrocarbyl diazaspiroalkanes wherein the nitrogen atoms are attached to the spiro-carbon atom, said diazaspiroalkane being optionally catalytically hydrogenated to produce open chain diamines.

---

This invention relates to a novel class of heterocyclic compounds and to the method for the production thereof. More particularly, it relates to novel N,N'-disubstituted diazaspiroalkanes.

Heterocyclic compounds containing two spiro rings, each of which contains an otherwise unsubstituted nitrogen atom are known in the art. For example, Patterson, "The Ring Index," discloses 1,6-diazaspiro[4,4]nonane as well as 2,8-diazaspiro[5.5]undecane. However, the presence within the heterocyclic rings of secondary nitrogen atoms, i.e., nitrogen atoms with a reactive hydrogen substituent, imposes limitations upon the utilities available for such compounds. It would be of advantage to provide a class of diazospiroalkanes wherein each nitrogen is tertiary, that is, possesses an organic substituent not a portion of the heterocyclic ring.

It is an object of this invention to provide a novel class of diazaspiroalkanes and a method for the production thereof. More particularly, it is an object to provide novel N,N'-disubstituted diazaspiroalkanes, that is, heterocyclic diazaspiro compounds wherein each ring incorporates a tertiary nitrogen atom. An additional object is to provide methods for the production of such diazaspiroalkanes and the conversion thereof to other useful organic diamines.

It has now been found that these objects are accomplished by the process of reacting certain diaza-oxo-dicycloalkylidines with aqueous acid to effect apparent opening of the carbonyl-containing ring, which, when followed by loss of carbon dioxide and ring closure, results in the production of the novel diazaspiroalkanes of the invention which may then be converted to other useful materials.

The diaza-oxo-dicycloalkylidines employed as starting materials in the process of the invention are best understood by consideration of methods for the production thereof. One such method involves condensation of certain lactams. The lactams that are employed to form the diaza-oxo-dicycloalkylidine reactants of the invention are hydrocarbon lactams, that is, contain only atoms of carbon, preferably from 4 to 20, and hydrogen besides the nitrogen atom and the carbonylic oxygen of the lactam linkage, and contain no non-aromatic carbon-carbon unsaturation. The lactams are further characterized by the presence of a methylene group, —CH$_2$—, as the carbon atom of the heterocyclic ring attached to the carbonyl moiety, by the presence of from 5 to 7 members in the heterocyclic ring, and by an organic substituent upon the lactam nitrogen which is not a member of the heterocyclic ring. Preferred lactams are represented by the formula

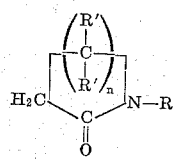

wherein R is hydrocarbon, e.g., alkyl, cycloalkyl or aralkyl, preferably having from 1 to 20 carbon atoms, more preferably from 1 to 12 carbon atoms, or aryl, preferably having from 6 to 10 carbon atoms, R' is hydrogen or R, and n is a whole number from 2 to 4 inclusive. Illustrative R groups as well as R' groups other than hydrogen are alkyl radicals such as methylethyl, butyl, hexyl, decyl and lauryl; aralkyl radicals such as phenyl and beta-phenylethyl; cycloalkyl radicals such as cyclopentyl, cyclohexyl and cyclooctyl; and aryl radicals, which is meant to include alkaryl, such as phenyl, tolyl, xylyl, cumyl, 2,4-diethylphenyl, p-tert-butylphenyl and 3-ethyl-5-propylphenyl. In general, preferred R groups are acyclic alkyl and preferred R' groups are hydrogen.

The lactams that are suitably employed are therefore N-substituted pyrrolidones such as 1-phenyl-2-pyrrolidone, 1-methyl-2-pyrrolidone, 1-isopropyl-4-methyl - 2 - pyrrolidone, 1-ethyl-4,5-dibutyl-2-pyrrolidone and 1-benzyl-4-phenyl-2-pyrrolidone; N-substituted piperidones such as 1-methyl-2-piperidone, 1-phenyl-2-piperidone, 1 - butyl - 5-methyl - 2 - piperidone and 1-isopropyl-4,5,5-trimethyl-2-piperidone; and N-substituted caprolactams such as N-butylcaprolactam, N-decylcaprolactam and N-tolylbeta-ethylcaprolactam.

The condensation of two such lactam molecules to form the diaza-oxo-dicycloalkylidine reactants of the process of the invention is effected by methods such as are described in German Patent specification 1,089,760. In a typical condensation process, two lactam molecules are condensed in the presence of an inorganic acid chloride, e.g., phosgene or phosphorus oxychloride, to produce the diaza-oxo-dicycloalkylidine. From the preferred lactams of the above depicted formula are produced diaza-oxo-dicycloalkylidines represented by the formula

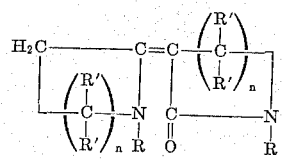

wherein R, R' and n have the previously stated significance. The condensation process is operable when the two lactam molecules are the same, or when they are different, so long as each lactam molecule is an N-substituted hydrocarbon lactam having from 5 to 7 members within the heterocyclic ring. Illustrative diaza-oxo-dicycloalkylidines include 2,3' - diphenyl - 2,3' - diaza - 2' - oxo-dicyclopentylidine prepared from condensation of two molecules of 1-phenyl-2-pyrrolidone, 2,3'-diethyl-2,3'-diazo-2'-oxo-dicyclohexylidine prepared from condensation of 1 - ethyl - 2 - piperidone, 2,3'-dibutyl-2,3'-diaza-2'-oxo-dicycloheptylidine prepared from condensation of two molecules of N-butylcaprolactam, 2,3',4,5'-tetramethyl-2,3'-diaza-2'-oxo-dicyclopentylidine prepared from condensation of two molecules of 1,4-dimethyl-2-pyrrolidone, and 3-(2-methyl-2-azacyclopentylidine) - 1 - methyl - 2- piperidone and 3 - (2-methyl - 2 - azacylohexylidine) - 1-methyl-2-pyrrolidone prepared from condensation of one molecule of 1-methyl-2-pyrrolidone and one molecule of 1-methyl-2-piperidone. The preferred diaza-oxo-dicycloalkylidine reactants, however, are those compounds of the above-depicted formula wherein corresponding R and R' radicals and corresponding n values are the same, that is, the diaza-oxo-dicycloalkylidines formed by condensation of two identical lactam moieties.

The diaza-oxo-dicycloalkylidines are reacted with aqueous acid to produce the novel diazaspiroalkanes of the invention. Although the mechanism of the reaction process is not completely understood, it is believed that a diaza-oxo-dicycloalkylidine molecule reacts with a proton from the acid and a molecule of water to open the carbonyl-containing ring thereby forming an amino acid intermediate which subsequently loses carbon dioxide and undergoes ring closure to form the diazaspiroalkane. In any event, the presence of water in the reaction system appears to be necessary, and it is preferred that sufficient aqueous acid be employed to afford at least one mole of water per mole of diaza-oxo-dicycloalkylidine.

The acid to be employed in aqueous solution is a non-oxidizing acid, is a strong acid and is sufficiently soluble in water to afford a moderately concentrated solution. Concentrations of aqueuous acid that are satisfactory are those that contain at least 5 equivalents of acid per liter of solution, and preferably contain at least 8 equivalents of acid per liter of solution, that is, concentrations of at least 5 normal, but preferably of at least 8 normal. By the term strong acid is meant an acid which dissociates extensively in moderately dilute aqueous solution. Acids that are sufficiently strong are those acids having a $pK_a$, defined as the negative logarithm of the ionization constant when measured at 25° C. for a 0.1 normal aqueous solution, of less than about 2.5. Illustrative of acids that are sufficiently strong and are sufficiently soluble in water are inorganic acids such as hydrochloric acid, sulfuric acid and phosphoric acid, as well as organic acids such as trichloroacetic acid and dichloroacetic acid. Particularly preferred is the use of hydrochloric acid, especially the commercially available "concentrated" hydrochloric acid solutions containing from about 20% to about 40% by weight hydrogen chloride. The acid is employed in molar excess over the diaza-oxo-dicycloalkylidine. Ratios of equivalents of acid to moles or organic reactant of at least 3:1 are satisfactory, while ratios of acid to diaza-oxo-dicycloalkylidine of at least 6:1 are preferred.

The process for the conversion of the diazo-oxo-dicyloalkylidine to the diazaspiroalkane is conducted by mixing the diaza-oxo-dicycloalkylidine with the aqueous acid and maintaining the reaction mixture at reaction temperature until reaction is complete. The reaction is conducted at any convenient temperature and pressure, so long as the reaction mixture is maintained in the liquid phase. When atmospheric pressure is employed, reaction temperatures above about 50° C. are satisfactory, although it is preferred to conduct the reaction at temperatures above about 90° C., and particular advantage is obtained when the reflux temperature of the reaction mixture is employed. Alternatively, the reaction may be conducted at superatmospheric pressure in which case somewhat higher reaction temperatures may be utilized. Subsequent to reaction, the acid is customarily neutralized and the organic products recovered by such conventional means as fractional distillation or selective extraction.

The N,N'-disubstituted diazaspiroalkane products of the invention possess two spiro azaalkane rings wherein each ring has from 5 to 7 members including the spiro carbon atoms, the aza moiety, i.e., the nitrogen atom, of each ring is attached to the spiro carbon atom, and the ring carbon atom attached to the spiro carbon atom has two hydrogen substituents. A preferred class contains only carbon and hydrogen atoms besides the two nitrogen atoms, and especially those of from 7 to 39 carbon atoms.

Preferred diazaspiroalkanes are represented by the formula

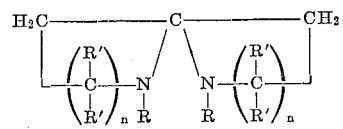

wherein R, R' and n have the previously stated significance. Illustrative diazaspiroalkanes include, 1,6-dimethyl-1,6 - diazaspiro[4.4]nonane, 1,3,6,8 - tetraethtyl - 1,6-diazaspiro[4.4]nonane, 1,6 - diphenyl - 1,6 - diazaspiro[4.4]nonane, 1,7 - dipropyl - 1,7 - diazaspiro[5.5]undecane, 1,7 - dibenzyl - 1,7 - diazaspiro[5.5]undecane, 1,8 - dimethyl - 1,8 - diazaspiro[6.6]tridecane, 1,8-ditolyl - 1,8 - diazaspiro[6.6]tridecane and 1,7-dibutyl-1,7-diazaspiro[5.6]dodecane.

The diazaspiroalkanes of the invention are uniquely useful because of the spiro structure wherein each ring contains a tertiary nitrogen atom. For example, the tertiary nitrogen atoms are converted by conventional methods to di(amine oxides), which are useful as detergents, particularly when the nitrogen substituent which is not a member of the heterocyclic ring is alkyl. The ditertiary amines are additionally useful as difunctional catalytic epoxy curing agents which, in contrast with primary or secondary amines that contain active hydrogen substituents, do not react with the epoxy compound except to initiate the polymerization process.

The diazaspiroalkanes are also useful as chemical intermediates. Catalytic hydrogenation of the diazaspiroalkane serves to hydrogenolyze one or both heterocyclic rings, depending on the hydrogenolysis conditions. Hydrogenolysis is effected by reacting the diazaspiroalkane with hydrogen in the presence of a catalytic amount of metallic hydrogenation catalyst. Particularly suitable hydrogenation catalysts comprise metals or metallic oxides of Group VII of the Periodic Table, e.g., platinum, palladium, rhodium, rhenium, platinum oxide or Raney nickel, which may be employed as unsupported materials or as supported catalysts on charcoal, silica, alumina or the like. Suitable amounts of catalyst are from about 0.1% to about 10% by weight of the reaction mixture. The hydrogenolysis is typically conducted by dissolving the diazaspiroalkane in an inert solvent such as lower alkanol or lower alkyl carboxylic acid and treating the solution with hydrogen until the desired degree of hydrogenolysis has occurred. When the hydrogenolysis is conducted under relatively mild conditions, ie.g., at temperatures from about 20° C. to about 50° C. and at hydrogen pressures from about 0.5 atmosphere to about 5 atmospheres, or when the hydrogenolysis is halted after consumption of one mole of hydrogen per mole of diazaspiroalkane, cleavage of one ring of the heterocycle spiro compound is observed to produce N-substituted-alpha-aminoalkyl heterocyclic compounds. When prepared from the preferred diazaspiroalkanes, these compounds are compounds are represented by the formula

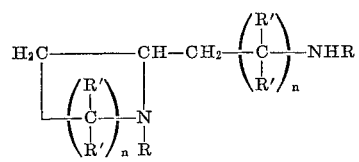

wherein R, R' and n have the previously staged significance. Typical products obtained by the hydrogenolysis of one ring of the diazaspiroalkanes are 1-methyl-2(4-methylaminobutyl)pyrrolidine, 1 - phenyl - 2(5-phenylaminoamyl)piperidine and 1 - benzyl-2(5-benzylaminoamyl)-piperidine. Alternatively, however, when the severity of the hydrogenolysis conditions is increased, both rings of the diazaspiroalkane are opened to produce an alpha, omega-diaminoalkane, which when prepared from a preferred diazaspiroalkane, is represented by the formula

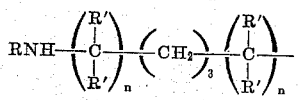

wherein R, R' and n have the previously stated significance. Preferred reaction conditions to effect cleavage of both rings include reaction temperatures of from about 60° C. to about 120° C. and hydrogen pressures from about 20 atmospheres to about 150 atmospheres. Illustrative products of this type include 1,7-bis(methylamino) heptane, 1,7 - bis(phenylamino)heptane, 1,9 - bis(propylamino)nonane and 1,11-bis(hexylamino)undecane.

To further illustrate the products and process of the invention, the following examples are provided. It should be understood that they are not to be regarded as limitations, as the teachings thereof may be varied as will be understood by one skilled in this art.

Example I

To a solution of 113 g. of 1,4-dimethyl-2-pyrrolidone in 340 g. of chlorobenzene at a temperature of 30–40° C. was added 154 g. of phosphorus oxychloride and the mixture was heated at 120° C. for 2 hours. The solution was poured upon ice and neutralized while cold with caustic soda. After the chlorobenzene was removed by steam-distillation, the residue was extracted with methylene chloride and dried over potassium carbonate. The product mixture was then distilled under high vacuum to afford 2,3',4,5' - tetramethyl - 2,3' - diaza - 2' - oxo - dicyclopentylidine, B.P. 98° C. at 0.01 mm., $n_{20}{}^D$ 1.5569, which represented a yield of 65% of theory.

*Analysis.*—Calc.: N, 13.45%. Found: N, 13.62%.

A mixture of 39.0 g. of this product and 150 ml. of 40% by weight hydrochloric acid was refluxed for 32 hours. At that time evolution of carbon dioxide had ceased, and the product mixture was cooled, alkalised with potassium hydroxide and extracted with chloroform. After drying the chloroform extract over sodium sulfate, the mixture was distilled to give 51 g., 90% of theory, of 1,3,6,8 - tetramethyl - 1,6 - diazaspiro[4.4]nonane, B.P. 80–83° C. at 10 mm.

*Analysis.*—Calc.: C, 72.47%; H, 12.16%; N, 15.37%. Found: C, 72.43%; H, 11.96%; N, 15.38%.

Example II

A mixture of 90 g. of 2,3'-dimethyl-2,3'-diaza-2'-oxo-dicyclopentylidine and 270 ml. of approximately 35% by weight hydrochloric acid was refluxed for 26 hours. The reaction product was alkalised while ice cold with caustic soda and extracted with methylene chloride. The extract was dried over potassium carbonate and distilled to give 46 g., 60% of theory, of 1,6-dimethyl-1,6-diazaspiro [4.4]nonane, B.P. 75–78° C. at 12 mm.

*Analysis.*—Calc.: C, 70.07%; H, 11.76%; N, 18.16%. Found: C, 69.69%; H, 11.54%; N, 17.90%.

Example III

The procedure of Example II was repeated, employing 71 g. of 2,3'-di-n-propyl-2,3'-diaza-2'-oxo-dicyclopentylidine and 200 ml. of 35% by weight hydrochloric acid. A yield of 47.6 g. of 1,6-dipropyl-1,6-diazaspiro [4.4]nonane, 75.3% of theory, was obtained, B.P. 55–60° C. at 0.1 mm.

This product formed a yellow dipicrate, M.P. 148.5° C. after recrystallization from 2:1 ethanol-water.

*Analysis.*—Calc. for $C_{25}H_{32}O_{14}N_8$: C, 44.91%; H, 4.82%; N, 16.76%. Found: C, 45.1%; H, 4.88%; N, 16.69%.

Example IV

A mixture of 61 g. of 2,3'-diphenyl-2,3'-diaza-2'-oxo-dicyclopentylidine and 200 ml. of approximately 35% by weight hydrochloric acid was refluxed for 26 hours. The reaction product was alkalised while cold with concentrated caustic soda and extracted with chloroform. The extract was dried over sodium sulfate, stripped of solvent and the residue crystallized from ligroin to yield 50 g. of 1,6-diphenyl-1,6-diazaspiro[4.4]nonane, 89.6% of theory, M.P. 132° C.

*Analysis.*—Calc.: C, 81.97%; H, 7.97%; N, 10.06%. Found: C, 81.04%; H, 7.92%; N, 10.17%.

Example V

The procedure of Example II was followed to react 51 g. of 2,3'-dimethyl-2,3'-diaza-2'-oxo-dicyclohexylidine with 150 ml. of approximately 35% by weight hydrochloric acid. A yield of 33.0 g., 73.9% of theory, of 1,7-dimethyl-1,7-diazaspiro[5.5]undecane was obtained, B.P. 111–114° C. at 12 mm.

*Analysis.*—Calc.: 72.47%; H, 12.16%; N, 15.37%. Found: C, 72.63%; H, 11.79%; N, 15.53%.

Example VI

In 100 ml. of dilute acetic acid (1:2) was dissolved 7.5 g. of 1,6-dimethyl-1,6-diazaspiro[4.4]nonane and the mixture hydrogenated under moderate $H_2$-pressure for 10 hours in the presence of 0.5 g. of $PtO_2$. The reaction product was filtered, alkalised with caustic soda and extracted with methylene chloride. The extract was dried over potassium carbonate and upon removal of solvent there was obtained 5.4 g., 71% of theory, of 1-methyl-2-(3-methylaminopropyl)pyrrolidine, B.P. 36–40° C. at 0.1 mm.

*Analysis.*—Calc.: C, 69.17%; H, 12.90%; N, 17.93%. Found: C, 68.56%; H, 12.63%; N, 17.87%.

Example VII

In a rocking reactor, 11.2 g. of 1,3,6,8-tetramethyl-1,6-diazaspiro[4.4]nonane in 50 ml. of acetic acid was reacted with hydrogen at atmospheric pressure and room temperature in the presence of $PtO_2$ until one equivalent of hydrogen had been consumed. The catalyst was removed by filtration and the acid solution concentrated to half the original volume by distillation under reduced pressure. The reaction mixture was alkalised while cool with potassium hydroxide and after the precipitated potassium acetate was removed by filtration, the mixture was extracted with chloroform. The extract was dried over sodium sulfate and fractionally distilled to give 10 g., 89% of theory, of 1-methyl-2-[3-(methylamino)-2-methylpropyl]-4-methylpyrrolidine, B.P. 94–96° C. at 10 mm.

*Analysis.*—Calc.: C, 71.68%; H, 13.13%; N, 15.20%. Found: C, 71.17%; H, 12.73%; N, 15.28%.

Example VIII

By a procedure similar to that of Example VII, 15 g., of 1,7-dimethyl-1,7-diazaspiro[5.5]undecane was reacted with hydrogen in dilute acetic acid (1:1) at approximately 1.1 atmospheres of hydrogen pressure. A yield of 12.4 g., 81.8% of theory, of 1-methyl-2-(4-methylaminobutyl)-piperidine was obtained, B.P. 80° C. at 0.05 mm.

*Analysis.*—Calc.: C, 71.68%; H, 13.13%; N, 15.20%. Found: C, 71.81%; H, 13.10%; N, 14.90%.

Example IX

In an autoclave, 28 g. of 1,6-diphenyl-1,6-diazaspiro [4.4]nonane was dissolved in 450 ml. of acetic acid and reacted with hydrogen at 50° C. and 100 atm. hydrogen pressure for 4 hours in the presence of 1.4 g. of platinum oxide. After the catalyst was removed by filtration and the acetic acid removed by distillation, the reaction mixture was alkalised with caustic soda while cold and extracted with chloroform. The extract was dried over sodium sulfate and distilled to give 19 g., a yield of 66.9% of theory, of 1,7-bis(phenylamino)heptane.

*Analysis.*—Calc.: C, 80.80%; H, 9.28%; N, 9.92%. Found: C, 80.32%; H, 9.63%; N, 10.12%.

Example X

By a procedure similar to that of Example IX, 50 g. of 1,3,6,8-tetramethyl - 1,6 - diazaspiro[4.4]nonane in acetic acid was reacted with hydrogen at 100° C. and 140 atm. of hydrogen pressure. A yield of 39 g., 75% of theory, of 2,6-dimethyl-1,7-bis(methylamino)heptane was obtained, B.P. 93-95° C. at 9 mm.

*Analysis.*—Calc.: C, 70.90%; H, 14.07%; N, 15.04%. Found: C, 70.40%; H, 13.60%; N, 15.10%.

Example XI

The procedure of Example IV was followed to react 118 g. of 2,3'-diisopropyl-2,3'-diaza-2'-oxo-dicyclopentylidine with concentrated hydrochloric acid. A yield of 70 g., 66.0% of theory, of 1,6-diisopropyl - 1,6 - diazaspiro[4.4]nonane was obtained, B.P. 55-65° C. at 0.1 mm.

Example XII

The product of Example XI, 10.5 g., was dissolved in 50 ml. of ethanol and hydrogenolyzed in the presence of platinum oxide at room temperature and one atmosphere gauge of hydrogen pressure. The reaction product was filtered and the solvent removed by vacuum distillation. A yield of 9.7 g., 95.1% of theory, of 1-isopropyl-2-(3-isopropylaminopropyl)pyrrolidine was obtained, B.P. 53-57° C. at 0.1 mm.

*Analysis.*—Calc.: C, 73.52%; H, 13.29%; N, 13.19%. Found: C, 73.04%; H, 13.06%; N, 13.54%.

Example XIII

The procedure of Example XI was followed to obtain a 52% yield of 1,6-dihexyl-1,6-diazaspiro[4.4]noane, B.P. 93-101° C. at 0.1 mm., from 2,3'-di-n-hexyl-2,3'-diaza-2'-oxo-dicyclopentylidine.

*Analysis.*—Calc.: C, 77.5%; H, 13.0%; N, 9.5%. Found: C, 77.4%; H, 12.6%; N, 9.5%.

Example XIV

A mixture of 14.7 g. of 2,3'-dimethyl-2,3'-diaza-2'-oxo-dicycloheptylidine and 100 ml. of concentrated hydrochloric acid was refluxed for 26 hours. The reaction product was alkalised while cool with caustic soda and extracted with methylene chloride. The extract was dried over potassium carbonate and the solvent removed by vacuum distillation. A yield of 7.4 g., 56.6% of theory, of 1,8 - dimethyl-1,8-diazaspiro[6.6]tridecane was obtained, B.P. 78° C. at 0.1 mm.

*Analysis.*—Calc.: C, 74.22%; H, 12.46%; N, 13.32%. Found: C, 72.65%; H, 12.19%; N, 12.58%.

We claim as our invention:

1. The process of reacting diaza-oxo-dicycloalkylidine of the formula

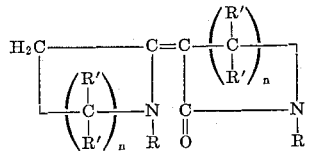

wherein R is selected from the group consisting of alkyl of up to 12 carbon atoms, aralkyl of up to 12 carbon atoms, cycloalkyl of up to 12 carbon atoms, and aryl of from 6 to 10 carbon atoms, R' is selected from the group consisting of hydrogen and R, and $n$ is a whole number from 2 to 4 inclusive, with non-oxidizing aqueous acid, said aqueous acid having a concentration of at least 8 equivalents of acid per liter of solution and said acid having a $pK_a$ of less than about 2.5, at a temperature of at least about 50° C.

2. The process of claim 1 wherein the acid is hydrochloric acid.

3. The process of claim 1 wherein the diaza-oxo-dicycloalkylidine is 2,3' - dialkyl-2,3'-diaza-2'-oxo-dicyclopentylidine.

4. The process of claim 3 wherein each alkyl substituent is methyl.

5. The process of claim 1 wherein the diaza-oxo-dicycloalkylidine is 2,3'-dialkyl - 2,3' - diaza-2'-oxo-dicycloheptylidine.

6. The process of reacting diaza-oxo-dicycloalkylidine of the formula

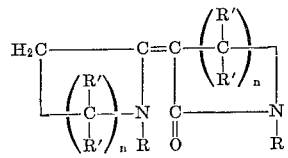

wherein R is selected from the group consisting of alkyl of up to 12 carbon atoms, aralkyl of up to 12 carbon atoms, cycloalkyl of up to 12 carbon atoms, R' is selected from the group consisting of hydrogen and R, and $n$ is a whole number from 2 to 4 inclusive, with non-oxidizing aqueous acid, said acid having a concentration of at least 8 equivalents of acid per liter of solution and said acid having a $pK_a$ of less than about 2.5, at a temperature of at least about 50° C., and catalytically hydrogenolyzing the product obtained thereby.

References Cited

UNITED STATES PATENTS 3,282,947  11/1966  Grogan et al. _____ 260—293 X

ALTON D. ROLLINS, *Primary Examiner.*